United States Patent [19]

Oshidari

[11] Patent Number: 5,086,671
[45] Date of Patent: Feb. 11, 1992

[54] QUICK DOWNSHIFT CONTROL IN HYBRID CONTINUOUSLY VARIABLE TRANSMISSION

[75] Inventor: Toshikazu Oshidari, Yokosuka, Japan

[73] Assignee: Nissan Motor Co., Ltd., Yokohama, Japan

[21] Appl. No.: 562,575

[22] Filed: Aug. 3, 1990

[30] Foreign Application Priority Data

Aug. 10, 1989 [JP] Japan ................. 1-205634

[51] Int. Cl.⁵ ............................................. F16H 11/02
[52] U.S. Cl. ................................... 74/867; 74/868; 474/28
[58] Field of Search ............... 474/18, 28, 69, 70, 474/72; 74/866, 867, 868

[56] References Cited

U.S. PATENT DOCUMENTS

| | | | |
|---|---|---|---|
| 4,579,021 | 4/1986 | Yamamuro | 74/868 X |
| 4,735,113 | 4/1988 | Yamamuro et al. | 74/866 |
| 4,751,859 | 6/1988 | Itoh et al. | 74/868 |
| 4,895,552 | 1/1990 | Abo et al. | 474/28 |
| 4,904,229 | 2/1990 | Hattori | 474/28 |
| 4,907,471 | 3/1990 | Ishimaru | 74/745 |

FOREIGN PATENT DOCUMENTS

| | | | |
|---|---|---|---|
| 1094111 | 4/1959 | Fed. Rep. of Germany | 474/28 |
| 62-93559 | 4/1987 | Japan . | |
| 0062959 | 3/1988 | Japan | 474/72 |
| 1-53924 | 3/1989 | Japan . | |

*Primary Examiner*—Leslie A. Braun
*Assistant Examiner*—Matthew Stavish
*Attorney, Agent, or Firm*—Foley & Lardner

[57] ABSTRACT

A hybrid transmission includes a gearing mechanism and a V-belt type continuously variable transmission mechanism, a shift command valve, a shift control valve, and a high clutch. The continuously variable transmission mechanism has a driver pulley connected to receive a hydraulic fluid pressure generated by the shift control valve. A neutral valve is fluidly disposed between the high clutch and the shift control valve and has a drain port. The neutral valve takes a predetermined position upon the shift command valve assuming an overstroke range position to drain the high clutch via the drain port thereof, causing the high clutch to be released quickly. The shift command valve assumes the overstroke range position upon kickdown operation, for example. Thus, improved kickdown operation is provided owing to the quick release of the high clutch.

7 Claims, 3 Drawing Sheets

QUICK DOWNSHIFT CONTROL IN HYBRID CONTINUOUSLY VARIABLE TRANSMISSION

RELATED PATENTS OR APPLICATIONS

U.S. patent application Ser. No. 07/278,887 filed on Dec. 2, 1988, now U.S. Pat. No. 4,907,471;

U.S. patent application Ser. No. 07/348,837 filed on May 8, 1989, now pending;

U.S. patent application Ser. No. 07/330,919 filed on Mar. 31, 1989, now U.S. Pat. No. 4,955,260;

U.S. patent application Ser. No. 07/330,918 filed on Mar. 31, 1989, now U.S. Pat. No. 4,895,552;

U.S. patent application Ser. No. 07/489,058 filed on Mar. 7, 1990, now pending;

U.S. patent application Ser. No. 07/544,865 claiming priority on Japanese Patent Application No. 1-188909 that was filed in Japan on July 24, 1989.

BACKGROUND OF THE INVENTION

The present invention relates to a hybrid continuously variable transmission including a continuously variable transmission mechanism and a gearing mechanism combined with the continuously variable transmission mechanism, and more particularly to a downshift control involving a transition from a drive taken over by the continuously variable transmission mechanism to a drive taken over by the gearing mechanism.

U.S. Pat. No. 4,735,113 discloses a V-belt type continuously variable transmission including a driver pulley, a follower pulley, and a V-belt drivingly interconnecting these pulleys. U.S. Pat. No. 4,907,471 discloses a hybrid continuously variable transmission in which the above-mentioned continuously variable transmission mechanism is combined with a gearing mechanism such that the gearing mechanism takes over a drive to provide a reduction ratio between a transmission input shaft and a transmission output shaft for start-up operation. The setting is such that this reduction ratio provided by the gearing mechanism is larger than the maximum or largest reduction ratio provided by the continuously variable transmission mechanism. For high speed operation where a relatively small drive force is required, the continuously variable transmission mechanism takes over a drive between the transmission input shaft and the transmission output shaft owing to engagement of a power interruption device, such as a clutch.

More specifically, the known hybrid continuously variable transmission includes a first clutch, namely a drive reverse clutch or a low clutch, and a second clutch, namely a high clutch, are provided. When the low clutch is engaged with the high clutch disengaged, an engine power is delivered by the gearing mechanism, while when, with the drive reverse clutch kept engaged, the high clutch is engaged, the engine power is delivered by the V-belt type continuously variable transmission. A transition from a drive taken over by the gearing mechanism to a drive taken over by the V-belt continuously variable transmission mechanism is effected by engaging the high clutch. Although the high clutch is engaged with the drive reverse clutch kept engaged, a one-way clutch is released to interrupt delivery of power from the gearing mechanism to the output shaft. Thus, the transistion in drive is made smoothly owing to the action of the one-way clutch.

The V-belt type continuously variable transmission mechanism includes a driver pulley with a driver pulley cylinder chamber, a follower pulley with a follower pulley cylinder chamber, and a V-belt drivingly interconnecting the driver and follower pulleys. For controlling the continuously variable transmission, a hydraulic fluid pressure acting within the driver pulley cylinder chamber is varied by a shift control valve. The shift control valve includes a spool which is operated via a shift operating mechanism by a shift motor in the form of a stepper motor under the control of a microcomputer controlled unit. With this arrangement, the hydraulic fluid pressure within the driver pulley cylinder chamber assumes different values, each corresponding to one of different positions which can be taken by the stepper motor. This hydraulic fluid pressure variable by the stepper motor is admitted to the high clutch.

As mentioned above, the high clutch is activated by the same hydraulic fluid pressure acting within the driver pulley cylinder chamber and thus controlled by the stepper motor. Thus, even if a quick downshift involving a disengagement of the high clutch is required, it takes a considerable time until the high clutch is disengaged since the hydraulic fluid pressure acting within the driver pulley cylinder chamber does not drop quickly. If the hydraulic fluid pressure within the driver pulley cylinder chamber is subject to a rapid drop, the tension on the V-belt is lost, causing the V-belt to slip. In order to prevent such slip of the V-belt, a large amount of hydraulic fluid has to be supplied to the follower pulley cylinder chamber, immediately. However, a pump cannot afford to supply of such large amount of hydraulic fluid to the follower pulley.

An object of the present invention is to improve a hybrid continuously variable transmission such that a clutch which is responsible for a transition from a drive taken over by a continuously variable transmission mechanism to a drive taken over by a gearing mechanism is released quickly for improved downshift feel.

SUMMARY OF THE INVENTION

According to the present invention, a hybrid transmission is provided with; a gearing mechanism, a continuously variable transmission mechanism combined with said gearing mechanism, a continuously variable transmission mechanism including a driver pulley, a follower pulley and a V-belt drivingly interconnecting said driver and follower pulleys, means including a high clutch for causing said continuously variable transmission to take over a drive in the hybrid transmission when said high clutch is engaged, but causing said gearing mechanism to take over a drive in the hybrid transmission upon releasing said high clutch to effect a downshift in reduction ratio in the hybrid transmission, means for controlling a speed ratio between said driver and follower pulleys to control a reduction ratio in the hybrid transmission when said continuously variable transmission mechanism takes over a drive in the hybrid transmission, said speed ratio controlling means including a shift command valve which assumes a predetermined position when said gearing mechanism takes over a drive in the hybrid transmission, and a shift control valve means operatively connected to said shift command valve for controlling supply of hydraulic fluid to and discharge thereof from said driver pulley, but discharging hydraulic fluid from said driver pulley upon said shift command valve assuming said predetermined position, means hydraulically interconnecting said high clutch and said shift control valve for establishing a fluid communication between said high clutch and said shift control valve, but blocking said fluid communication and draining said high clutch upon said shift command valve assuming said predetermined position.

DETAILED DESCRIPTION OF THE EMBODIMENT

Figure 2:
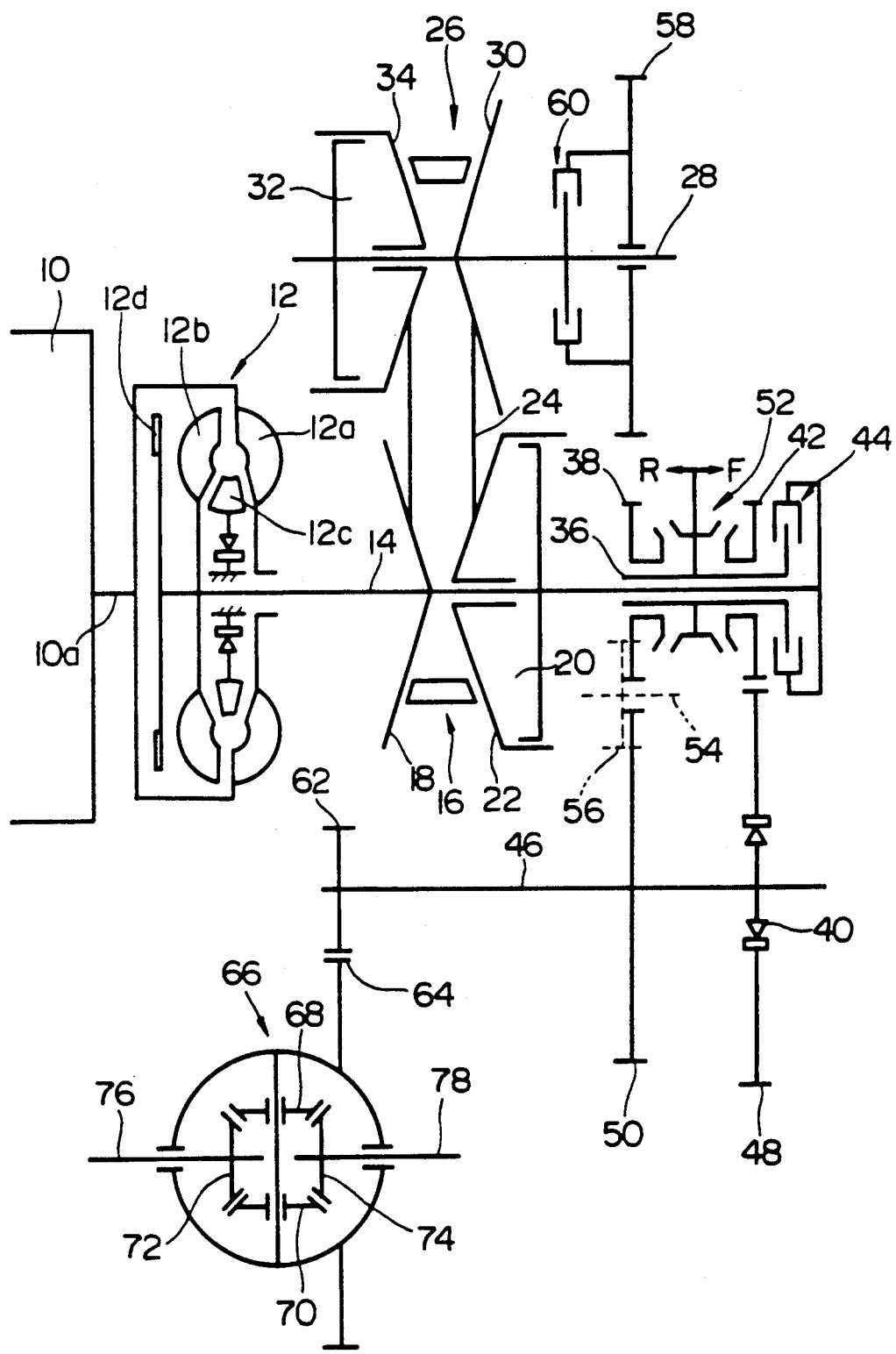
FIG. 2 is a schematic diagram of a power train of the hybrid transmission including a gearing mechanism combined with a continuously variable transmission mechanism.
Figure 3:
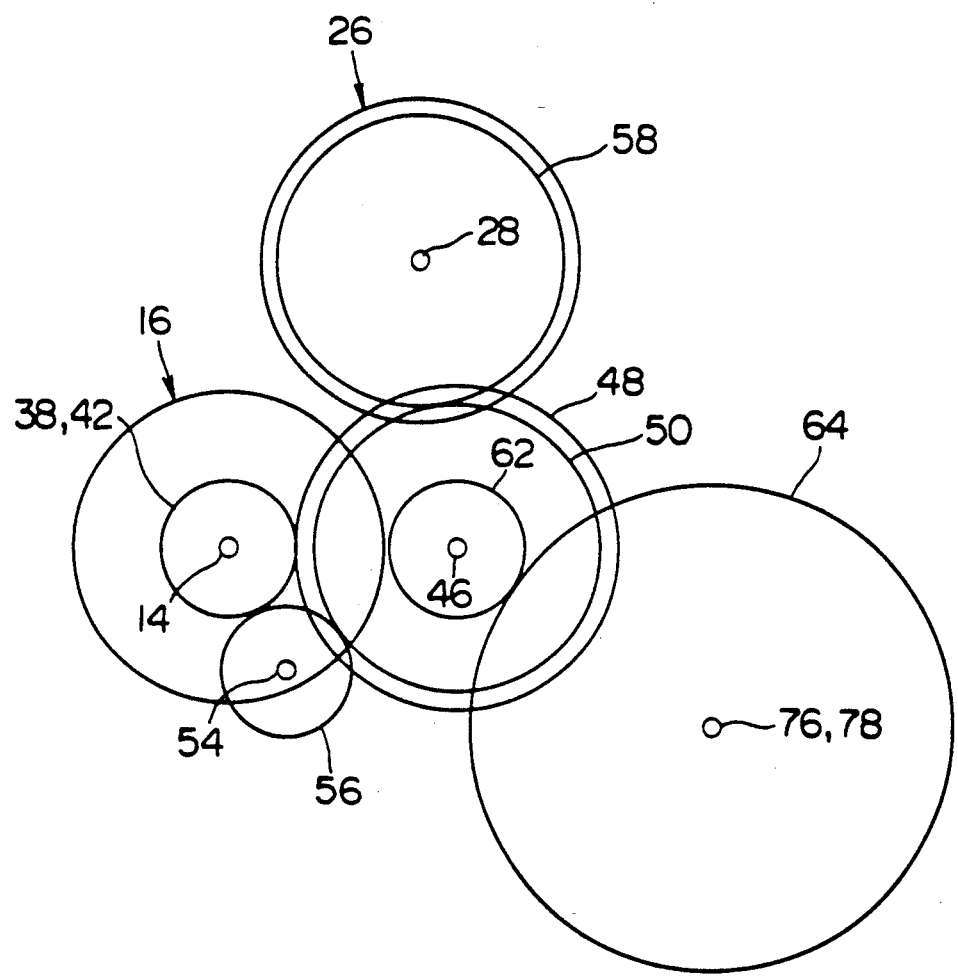
FIG. 3 is a diagram illustrating arrangement of a variety of different shafts of the hybrid transmission.

Referring to FIG. 2, an engine 10 is shown as having an output shaft 10a with which a torque converter 12 is coupled in the conventional manner. The torque converter 12 includes, as usual, a pump impeller 12a, a turbine runner 12b, and a stator 12c. It also includes a lock-up clutch 12d which the pump impeller 12a and turbine runner 12b are selectively interconnected with. The turbine runner 12b of the torque converter 12 is drivingly connected to a driver shaft 14. On the driver shaft 14 is a driver pulley 16. The driver pulley 16 includes an axially stationary conical member 18 fixedly connected to the driver shaft 14, and an axially movable conical member 22 connected to the driver shaft 14 in opposed spaced relationship with the stationary conical member 18. The conical members 18 and 22 define therebetween a V-shaped pulley groove. The driver pulley 16 includes a driver pulley cylinder chamber 20. The movable conical member 22 is axially movable toward the stationary conical member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially stationary conical member 30 fixedly connected to a follower shaft 28, and an axially movable conical member 34 connected to the follower shaft 28 for axial movement. The conical members 30 and 34 define therebetween a V-shaped pulley groove. The follower pulley 26 includes a follower pulley cylinder chamber 32. The movable conical member 34 is axially movable toward the stationary conical member 30 in response to hydraulic pressure developed in the follower pulley cylinder chamber 32. The driver pulley 16, V-belt 24, and the follower pulley 26 form a V-belt type continuously variable transmission mechanism. The setting is such that the maximum reduction ratio provided by this V-belt type continuously variable transmission mechanism is smaller than the reduction ratio provided by a forward gear 42 on the driver shaft side and a forward gear 48 on the output shaft side, which are described later. The driver shaft 14 extends through a hollow shaft 36. The hollow shaft 36 is rotatably supported on the driver shaft 14. Rotatably supported on the hollow shaft 36 are a reverse gear 38 and a forward gear 42. The forward gear 42 and the reverse gear 38 are selectivly connected to the hollow shaft 36 by means of a mechanical selector in the form of a synchronous dog clutch 52 having a forward position (F position), a reverse position (R position), and a neutral position. Alternatively, a dog clutch without neutral position may be used. With a drive reverse clutch 44, the driver shaft 14 is selectively connected to the hollow shaft 36. Extending in parallel to the driver shaft 14 is an output shaft 46. The output shaft 46 has the above-mentioned forward gear 42 mounted thereto via a one-way clutch 40 and a reverse gear 50 for unitary rotation therewith. The forward gear 48 is in constant mesh with the forward gear 42. The reverse gear 50 is in constant mesh with a reverse idler gear 56 that is rotatable with an idler shaft 54. The reverse idler gear 56 is in constant mesh with the reverse gear 38, too. In FIG. 3, since it is impossible to illustrate them in the cross sectional plane as shown in FIG. 2, the reverse idler shaft 54 and reverse idler gear 56 are illustrated by the broken line. Actually, they are arranged as illustrated in FIG. 3. In FIG. 2, the distances between the shafts and the gear diameter do not reflect the actual relationship. Thus, in order to know the actual relationship, reference should be made to FIG. 3. The follower shaft 28 has a forward gear 58. Via a high clutch 60, the forward gear 58 is connected to the follower shaft 28. As best seen in FIG. 3, the forward gear 58 is in constant mesh with the reverse gear 50. The forward gear 58 and the reverse gear 50 have the same diameter. The output shaft 46 has a reduction gear 62 for rotation therewith. The reduction gear 62 is in constant mesh with a final gear 64 of a differential 66. The differential 66 includes a pair of pinion gears 68 and 70 wich are rotatable with the final gear 64. A pair of side gear 72 and 74 mesh with the pinion gears 68 and 70. The side gears 72 and 74 are coupled with drive axles 76 and 78, respectively, for rotation therewith.

The neutral state is provided when the drive reverse clutch 44 and the high clutch 60 are both released. In this state, the transmission of engine power from the driver shaft 14 to the output shaft 46 is interrupted.

On start-up or hill-climbing where a relatively large driving force is required, the dog clutch 52 is shifted to the F position and the low clutch 44 is engaged. The high clutch 60 is released. In this state, rotation of the output shaft 10a of the engine 10 is transmitted via the torque converter 12 to the driver shaft 14, and further to the hollow shaft 36 via the drive reverse clutch 44 that is engaged. Rotation of the hollow shaft 36 is transmitted via the dog clutch 52 to the forward gear 42, and further to the forward gear 48 which the gear 42 meshes with. Owing to the fact that the forward gear 48 is drivingly connected via the one-way clutch 40 to the output shaft 46, rotation is transmitted to the output shaft 46. Thereafter, the rotation is transmitted via the reduction gear 62 and the final gear 64 to the differential 66 where it is distributed between the drive axles 76 and 78, causing wheels of the vehicle, not illustrated, to rotate. During the power transmission mentioned above, the gearing mechanism including the gears 42 and 48 takes over a drive between the shafts 14 and 46. At the reduction ratio provided by the the gears 42 and 48 which are intermeshed, the torque is increased, thus providing a relatively large driving force.

When the operating condition develops and demands a less driving force, the high clutch 60 is engaged with the above described state maintained. This causes the V-belt type continuously variable transmission mechanism to take over a drive between the shafts 14 and 46. Rotation of the driver shaft 14 is transmitted via the V-belt 24 and the follower pulley 26 to the follower shaft 28, and further to the forward gear 58 via the high clutch 60 that is engaged. Since the forward gear 58 meshes with the reverse gear 50, rotation is transmitted to the output shaft 46, and further to the drive axles 76 and 78 via the same power delivery path as previously described. In this case, the output shaft 46 rotates at a higher speed than the forward gear 48 does, and thus the one-way clutch 40 idles. This allows the drive reverse clutch 44 to be kept engaged. In the manner as described above, the rotation is transmitted by the V-belt type continuously variable transmission mechanism. Thus, the reduction ratio can be varied continuously by varying the width of the V-groove of the driver pulley 16 which in turn induces variation in the width of the follower pulley 26.

In establishing the reverse state, the dog clutch 52 is shifted to the R position, causing the reverse gear 38 to rotate with the hollow shaft 36 as a unit, and the drive reverse clutch 44 is engaged with the high clutch 60 released. In this state, the rotation of the drive shaft 14 is transmitted via the drive reverse clutch 44, the hollow shaft 36, the dog clutch 52, the reverse clutch 53, the reverse gear 38, the reverse idler gear 56 and the reverse gear 50 to the output shaft 46. Since the reverse idler gear 56 is disposed in the power delivery path, the direction of rotation of the output shaft 46 is the opposite to the direction of rotation of the output shaft 46. Thus, the vehicle can travel in the reverse direction.

Figure 1:
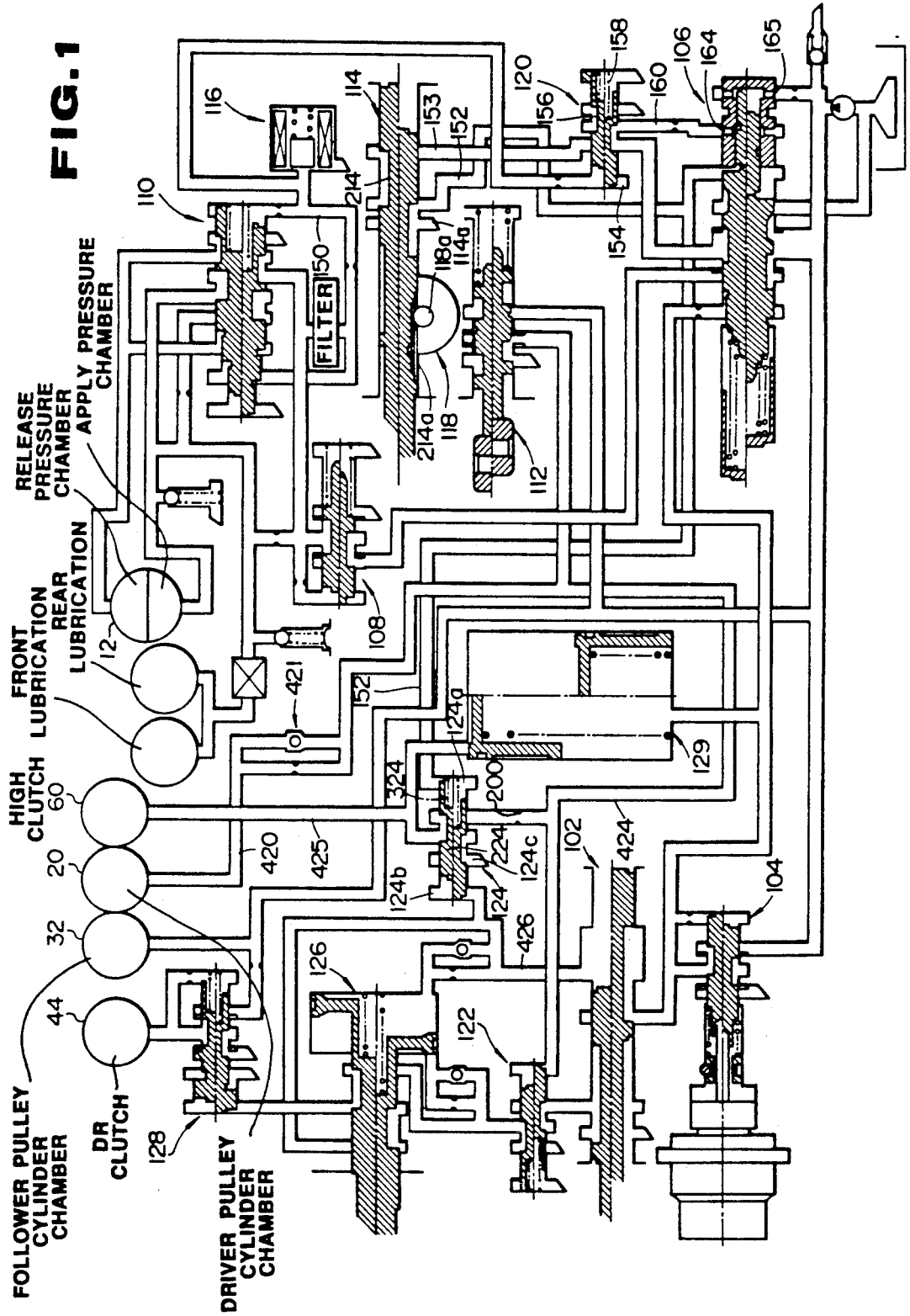
FIG. 1 is a hydraulic circuit diagram illustrating a hydraulic control system for a hybrid transmission.

Referring to FIG. 1, the hydraulic control system for the hybrid transmission is now described. The hydraulic control system is responsible for a ratio change control. The system generally comprises a manual valve 102, a throttle valve 104, a line pressure regulator valve 106, a torque converter pressure reduction valve 108, a lock-up control valve 110, a shift control valve 112, a shift command valve 114, a solenoid valve 116, a stepper motor 118, a line pressure servo valve 120, a reverse inhibitor valve 122, a neutral valve 124, a shift valve 126, a drive reverse clutch pressure amplifier valve 128, and a high clutch accumulator 129. The drive reverse clutch 44, high clutch 60, driver pulley cylinder chamber 20, follower pulley cylinder chamber 32, and an apply pressure chamber and a release pressure chamber of the torque converter 12 are connected to the above-mentioned hydraulic elements. The manual valve 102 is operatively connected with a select lever to be manually operated by a driver. The throttle valve 104 effects pressure regulation in response to engine intake manifold vacuum and generates a throttle pressure which is in inverse proportion to the magnitude of the manifold vacuum. The line pressure regulator valve 106 is a valve to adjust the pressure of hydraulic fluid discharged by the oil pump, no numeral. The torque converter pressure reduction valve 108 is a pressure regulator valve to keep the pressure supplied to the torque converter 12 in a predetermined state. The lock-up control valve 110 is a valve to control engagement/release of a lock-up clutch. The shift control valve 112 is a valve to control a ratio change in the V-belt type continuously variable transmission. The shift command valve 114 is actuated by the stepper motor 118 and issues a command for a reduction ratio which the V-belt type continuously variable transmission should shift. The solenoid valve 116 has a task to control the lock-up control valve 110 and another task to control the line pressure. The stepper motor 118 actuates the shift command valve 114 in response to an output signal of a microcomputer controlled control unit. The line pressure servo valve 120 is responsible for a boost-up of the line pressure when the continuously variable transmission mechanism takes over a drive in the hybrid transmission. For further understanding of the boost-up by the line pressure servo 120, a reference should be made to U.S. patent application Ser. No. 07/330,919 filed on Mar. 31, 1989 by the same Applicant as the present Application now U.S. Pat. No. 4,955,260 issued on Sept. 11, 1990. The reverse inhibitor valve 122 is a valve to prevent interlock which otherwise would be caused when the high clutch 60 and the drive reverse clutch 44 are engaged simultaneously. The neutral valve 124 is a valve to securely provide the neutral state. The shift valve 126 is a valve to shift the dog clutch 52. The high clutch accumulator 129 is an accumulator to alleviate shock upon engagement by the high clutch 60. The driver reverse clutch amplifier valve 128 is a valve to control hydraulic fluid pressure supplied to the drive reverse clutch 44.

Hereinafter, the shift command valve 114, and neutral valve 124 are further described.

The shift command valve 114 has a spool 214 formed with a rack 214a meshing with a pinion 118a of the stepper motor 118. The spool 214 is axially displaceable under the control of the stepper motor 118. When the stepper motor 118 rotates between a first position corresponding to the minimum reduction ratio of the V-belt type continuously variable transmission mechanism and a second position corresponding to the maximum reduction ratio of the V-belt type continuously variable transmission mechanism, the spool 214 allows fluid communication between a hydraulic fluid conduit 152 and a drain port 114a (see the lower half portion of the spool 214 viewing in FIG. 1). The lower half portion of the spool 214 viewing in FIG. 1 indicates the position of the spool 214 corresponding to the minimum reduction ratio. Rotating the stepper motor 118 beyond the position corresponding to the maximum reduction ratio causes the spool 214 to stroke to an overstroke range. When the spool 214 assumes this overstroke range position (see the upper half portion of the spool 214 viewing in FIG. 1), the fluid communication between the conduit 152 and drain port 114a is blocked and a fluid communication between the conduit and a hydraulic fluid conduit 153 is established. The conduit 153 is always supplied with the line pressure generated by the regulator valve 106.

The conduit 152 is connected to a port 124a of the neutral valve 124. The neutral valve 124 includes a spool 224 and a spring 324 disposed in a chamber which the above-mentioned port 124a is open at. The spool 224 is movable between a first or spring set position as illustrated by the lower half thereof viewing in FIG. 1 and a second position as illustrated by the upper half thereof viewing in FIG. 1. When the spool 224 assumes the first position thereof, a hydraulic conduit 425 connected to the high clutch 60 is isolated from a hydraulic fluid supply conduit 424 and connected to a drain port 124c. An orifice 200 is provided in the supply conduit 424. When the spool 224 assumes the second position thereof, the conduit 425 is connected to the supply conduit 424 and isolated from the drain port 124c. The supply conduit 424 communicates with a hydraulic conduit 420 at a portion upstream of one-way flow orifice 421. The conduit 420 is connected to the driver pulley cylinder chamber 20. The spool 224 is shiftable between the above-mentioned two positions in response to hydraulic pressure supplied to a port 124b and hydraulic pressure supplied to the port 124a communicating with the conduit 152. The port 124b communicates with a hydraulic conduit 426 which is supplied with hydraulic pressure, namely a forward range pressure, which develops during the forward travel.

The operation of this embodiment is described. Under circumstances where the V-belt type continuously variable transmission mechanism should take over a drive between the shafts 14 and 46, the spool 214 of the shift command valve 114 allows the conduit 152 to be drained via the drain port 114a. Thus, no hydraulic fluid pressure is supplied to the port 124a of the neutral valve 124, leaving the spool 224 of the neutral valve 124 to change its position in response to the hydraulic pressure supplied to the port 124b and the force of the spring 324. Since the so-called forward range pressure is always supplied to the port 124b, the spool 224 assumes the position as illustrated by the upper half portion thereof as viewed in FIG. 1 during the forward drive, the same hydraulic pressure as that supplied to the driver pulley cylinder chamber 20 is supplied to the high clutch 60 via the supply conduit 424 and the conduit 425 leading to the high clutch 60.

If the spool 214 of the shift command valve 114 is displaced to the overstroke range position as illustrated by the upper half portion thereof as viewed in FIG. 1 owing to rotation of the stepper motor 118 beyond the continuously variable range into the overstroke range, the conduit 152 is isolated from the drain port 114a and connected to the line pressure conduit 153. Thus, the line pressure is supplied via the conduit 152 to the port 124a of the neutral valve 124. Since the line pressure is not lower than the forward range pressure, the spool 224 of the neutral valve 124 is displaced to assume the position as illustrated by the lower half portion illustrated in FIG. 1 owing to the action of the spring 324 and the line pressure supplied to the port 124a. In this position of the spool 224, the conduit 425 is isolated from the supply conduit 424 and connected to the drain port 124c, thus draining the high clutch 60 via the drain port 124c. Accordingly, the high clutch 60 is released immediately after the spool 224 of the neutral valve 124 has shifted to the position as illustrated by the lower half portion thereof viewing in FIG. 1. From the previous description, it is appreciated that the high clutch 60 is released quickly and immediately after the spool 214 of the shift command valve 114 has shifted to the overstroke range position. The gearing mechanism takes over a drive between the shafts 14 and 46 upon completion of the release of the high clutch 60.

Since the spool 214 of the shift command valve 114 shifts to the overstroke range position upon kickdown operation or upon rapid release of the accelerator pedal for coastdown operation, the hybrid transmission can downshift quickly owing to the quick release of the high clutch 60. Since discharge of hydraulic fluid from the driver pulley cylinder chamber 20 is controlled by the orifice of the one-way orifice 421 disposed in the conduit 420, the V-belt 24 is prevented from slipping relative to the driver and follower pulleys 16 and 26 during the downshift operation involving the release of the high clutch 60.

It will now be appreciated that improved kickdown and coastdown performances are added to the hybrid transmission.

What is claimed is:

1. In a hybrid transmission:
   a gearing mechanism;
   a continuously variable transmission mechanism combined with said gearing mechanism, a continuously variable transmission mechanism including a driver pulley, a follower pulley and a V-Belt drivingly interconnecting said driver and follower pulleys;
   means including a high clutch for causing said continuously variable transmission to take over a drive in the hybrid transmission when said high clutch is engaged, but causing said gearing mechanism to take over a drive in the hybrid transmission upon releasing said high clutch to effect a downshift in reduction ratio in the hybrid transmission;
   means for controlling a speed ratio between said driver and follower pulleys to control a reduction ratio in the hybrid transmission mechanism takes over a drive in the hybrid transmission, said speed ratio controlling means including a shift command valve which assumes a predetermined position when said gearing mechanism takes over a drive in the hybrid transmission, and a shift control valve means operatively connected to said shift command valve for controlling supply of hydraulic fluid to and discharge thereof from said driver pulley, but discharging hydraulic fluid from said driver pulley upon said shift command valve assuming said predetermined position;
   means hydraulically interconnecting said high clutch and said shift control valve for establishing a fluid communication between said high clutch and said shift control valve, but blocking said fluid communication and draining said high clutch upon said shift command valve assuming said predetermined position; and
   wherein said speed ratio controlling means includes a manual valve having a forward drive position, and said fluid communication establishing means includes a neutral valve means fluidly disposed between said high clutch and said shift control valve means for establishing said fluid communication upon said manual valve assuming said forward drive position, but blocking said fluid communication and draining said high clutch upon said shift command valve assuming said predetermined position.

2. A hybrid transmission as claimed in claim 1, wherein said speed ratio controlling means includes a pump means for discharging a hydraulic fluid under pressure, means receiving said hydraulic fluid discharged by said pump means for generating a line pressure, said line pressure being supplied to said follower pulley.

3. A hybrid transmission as claimed in claim 2, wherein said shift command valve includes an inlet port connected to said line pressure generating means to receive said line pressure, an outlet port, and a drain port, and said shift command valve allows said outlet port to connect with said inlet port and disconnect from said drain port when said shift command valve assumes said predetermined position.

4. A hybrid transmission as claimed in claim 3, wherein said neutral valve means is connected to said outlet port of said shift command valve and responsive to said line pressure supplied to said outlet port to drain said high clutch.

5. A hybrid transmission as claimed in claim 4, wherein said fluid communication establishing means includes an orifice fluidly disposed between said neutral valve means and said shift control valve means.

6. A hybrid transmission as claimed in claim 5, wherein said fluid communication establishing means includes an accumulator having a piston means defining a variable volume chamber fluidly disposed between said high clutch and said neutral valve means.

7. In a hybrid transmission:
a gearing mechanism;
a continuously variable transmission mechanism combined with said gearing mechanism, a continuously variable transmission mechanism including a driver pulley, a follower pulley and a V-belt drivingly interconnecting said driver and follower pulleys;
means including a high clutch for causing said continuously variable transmission to take over a drive in the hybrid transmission when said high clutch is engaged, but causing said gearing mechanism to take over a drive in the hybrid transmission upon releasing said high clutch to effect a downshift in reduction ratio in the hybrid transmission;
means for controlling a speed ratio between said driver and follower pulleys to control a reduction ratio in the hybrid transmission when said continuously variable transmission mechanism takes over a drive in the hybrid transmission, said speed ratio controlling means including a shift command valve which assumes a predetermined position when said gearing mechanism takes over ad rive in the hybrid transmission, and a shift control valve means operatively connected to said shift command valve for controlling supply of hydraulic fluid to and discharge thereof from said driver pulley, but discharging hydraulic fluid from said driver pulley upon said shift command valve assuming said predetermined position;
conduit means hydraulically interconnecting said high clutch and said shift control valve for establishing a fluid communication between said high clutch and said shift control valve; and
means fluidly disposed in said conduit means between said high clutch and said shift control valve for blocking a fluid communication through said conduit means between said high clutch and said shift control valve and draining said high clutch upon said shift command valve assuming said predetermined position.

* * * * *